INVENTOR.
Harold P. Phillips
BY Earl & Chappell
ATTORNEYS

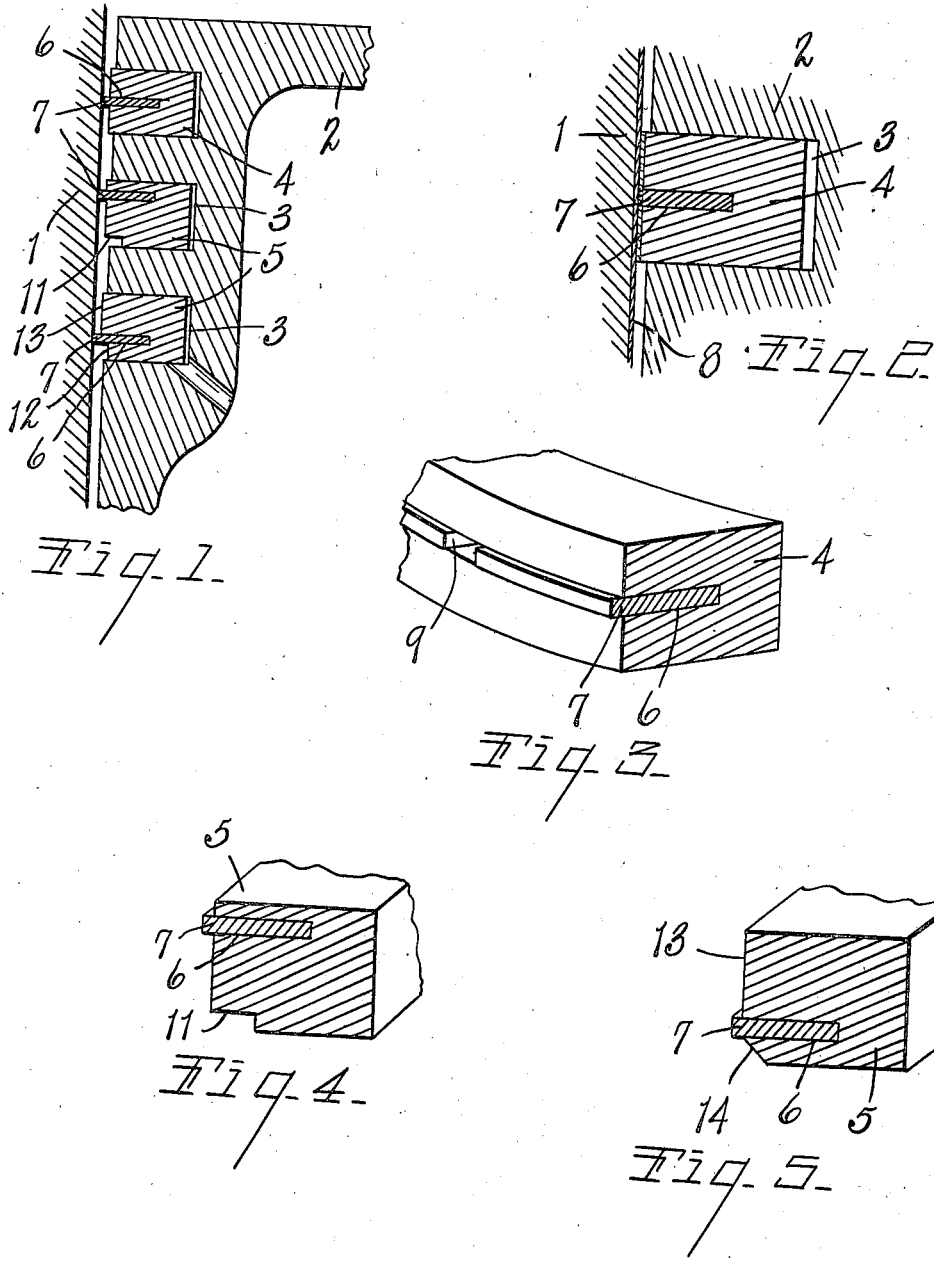
July 28, 1942.     H. P. PHILLIPS     2,291,505
PISTON RING
Filed Nov. 4, 1939     2 Sheets-Sheet 1
INVENTOR.
Harold P. Phillips
BY Earl & Chappell
ATTORNEYS July 28, 1942.  H. P. PHILLIPS  2,291,505
PISTON RING
Filed Nov. 4, 1939   2 Sheets-Sheet 2

Patented July 28, 1942

2,291,505

UNITED STATES PATENT OFFICE 2,291,505

PISTON RING

Harold P. Phillips, Hastings, Mich., assignor to Hastings Manufacturing Company, Hastings, Mich.

Application November 4, 1939, Serial No. 302,858

6 Claims. (Cl. 309—44)

The main objects of this invention are:

First, to provide a piston ring assembly which is effective in applying a thin film or coating of a so-called lubricating metal to the cylinder wall and which is in part transferred to the face of the ring during the initial or early operation of the ring to prevent "scuffing" during such period and later in the event of failure of the lubricating system or insufficient lubrication.

Second, to provide a piston ring assembly of the type described having a narrow contractile element of relatively soft metal such as brass, Babbit metal, or one of the so-called lubricating or bearing metals inserted in a peripheral groove provided therefor and initially projecting from the cylinder wall engaging face or surface of the ring to quickly coat the cylinder wall and/or ring surface during the early period of operation of the ring or at a later period of operation in the event of failure of the lubricant supply.

Third, to provide a piston ring assembly having the aforesaid metal lubricating feature and also providing a relatively hard wear resistant surface to afford adequate durability and also to maintain a suitable unit cylinder wall pressure.

Objects relating to details and economies of the invention will appear from the description to follow. The invention is defined and pointed out in the claims.

Preferred embodiments of the invention are illustrated in the accompanying drawings, in which:

Fig. 1 is a fragmentary view in vertical section illustrating a cylinder wall and piston with my improved piston rings in association therewith.

Fig. 2 is a fragmentary section illustrating the manner in which the relatively soft insert applies a coating to the cylinder wall during the early or initial use of the ring, the ring illustrated in Fig. 2 being that arranged in the first or top groove.

Fig. 3 is a fragmentary view of the embodiment of the ring shown in Fig. 2.

Fig. 4 is a fragmentary perspective view of a modified form or embodiment of my invention in which the main ring element is provided with a scraper groove, this type of ring being shown in the second or intermediate groove in Fig. 1.

Fig. 5 is a fragmentary perspective view of another form or embodiment of the ring, it being a form or modification of the embodiment of the bottom piston ring groove in Fig. 1.

Figure 6:
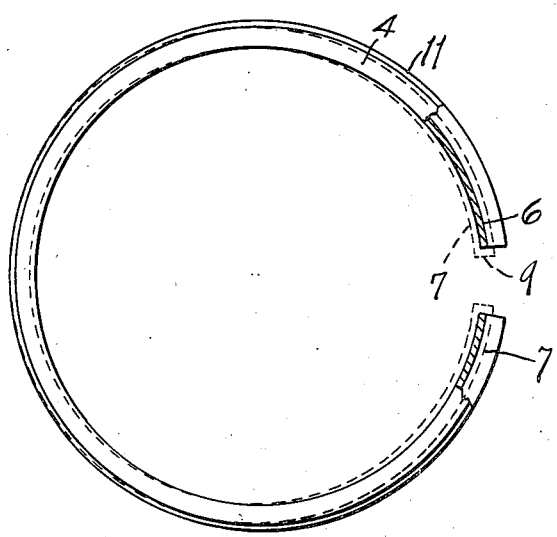
Fig. 6 is a view illustrating the main ring element with the outline of the relatively soft insert element of lubricating metal superimposed over the main ring in dotted lines to show the relative shape of the two elements.

In the accompanying drawings I have made no attempt to show the parts in accurate dimensions or in accurate proportions.

My present invention relates to a piston ring assembly comprising a main ring of relatively hard material such as cast iron and an insert arranged in a peripheral groove in the main ring, the insert being formed of a relatively thin soft metal having certain lubricating qualities. The insert is formed as a coil and is in contractile engaging relation to the main ring.

The insert initially projects from the face of the main ring so that during the initial use of the ring the insert quite quickly wears down flush with the face of the main ring and deposits a bearing metal coating or film on the cylinder wall and the face of the main ring. This film fills up the minute cavities in the cylinder wall and on the face of the piston ring by transference of the material from the cylinder wall to the ring. This film or coating functions to prevent scuffing not only during the early use of "wear in" period but also during periods of operation when the cylinder walls are not properly lubricated as may result from failure of the lubricating system or improper lubricant or diluted lubricant or the like. A further advantage is that the insert, being in contractile slidable relation to the groove of the main ring, may be slipped around the latter or in or out of engagement before or after installation in the cylinder so that the joint is out of alignment with the joint of the main ring.

In the accompanying drawings, the reference numeral 1 indicates a cylinder and 2 the coacting piston having a plurality of piston ring grooves 3. In the several piston grooves I show slightly different embodiments of my invention.

The compression ring 4 in the top groove is of rectangular cross section and is provided with an annular narrow groove 6 spaced approximately centrally between its side surfaces. In this groove I mount a relatively thin split insert element 7 of a suitable lubricating metal such as brass, Babbit metal, bronze, lead or other suitable metal having a tendency when subjected to friction to wear down and deposit a thin film or coating of lubricating metal on the coacting frictional surface. This film is shown much exaggerated in Fig. 2 and is designated by the numeral 8.

I have found that when anything more than a very small portion of the cylinder wall engaging surface is constituted by such an insert of metallic lubricating metal the result is an extremely rapid wear of the ring and consequent early failure of the ring so far as successful sealing and slap-free operation is concerned. It is therefore a feature of primary importance with my invention that the insert 7 be of thin or relatively small axial dimension or face width. For example, in a ring wherein the total face area including the insert is approximately .062 a satisfactory proportioning permits a width of .015 inch for the axial or face width of the insert 7. In other words, approximately 25% of the total face area is occupied by the insert. This width should not be increased above 30% of the total face width and I consider it desirable to reduce the same to 10% or even less. In other words, the metal lubricating insert should be made just as narrow in proportion to the cast iron body as is practically possible and maintain the desired strength and durability during the initial "wear in" period.

Furthermore, I have found it desirable to use as shallow an insert, in the sense of radial thickness, as is practical and I contemplate a radial thickness of approximately .050. This element should be set into the ring only sufficiently to adequately support the same during reciprocation. The recessing or grooving of the cast iron main ring 5 to receive the insert decreases its strength somewhat and tends to reduce its tension and these thoughts should be borne in mind in the commercial manufacture of the ring.

Figure 7:
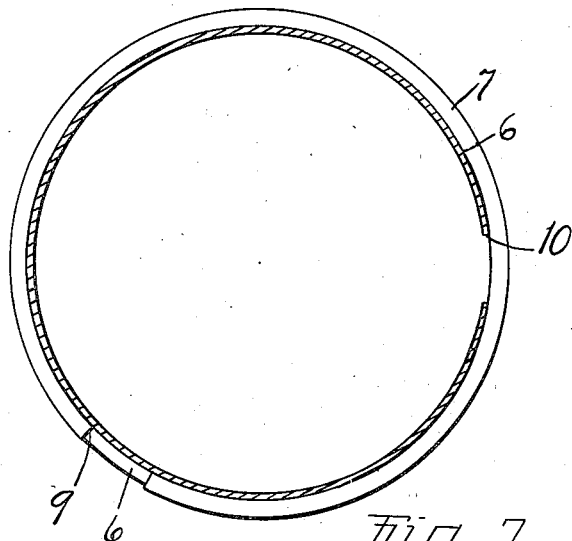
Fig. 7 is a plan view in section through the main ring element illustrating the relation of the insert thereto.

In the preferred embodiment the insert is set into the ring approximately .040 to .060 of an inch. When installed as illustrated in Fig. 7 the insert 7 projects radially only slightly beyond the outer cylinder wall engaging face of the main ring and during initial use wears flush with the face of the ring as illustrated in Fig. 2, the while depositing a uniformly thick coating or film 8 on the cylinder wall and also on the face of the ring by transfer from the cylinder wall.

The entire expansive action of the assembly is provided by the main ring member 5, or it is obvious that expanding springs may be used, but they are seldom used in compression rings and ordinarily not considered desirable. The insert itself is preferably contractile in nature, being wound around a mandrel of smaller diameter than the radius of the bottom of the groove when the main ring is compressed within a piston groove. This results in the insert exerting a gripping action on the main ring. This relation is illustrated in Fig. 6 wherein the outline of the insert 7 is shown by dotted lines with relation to the main ring and its groove. In a suitable embodiment the insert has approximately .001 to .005 inch clearance between the top and bottom walls of the groove and is slidable so as to permit the split or gap 9 of the insert to be staggered angularly substantially from the split or gap 10 of the main ring as is shown in Fig. 7. This adjustment may be performed at the time of installation, either before or after the ring assembly has been slipped into the piston groove.

A piston ring assembly having the comparatively light insert of lubricating metal completely eliminates the danger of objectionable scuffing during the early or initial use of the ring and under conditions of insufficient lubrication and thus greatly increases the life of the piston ring and reduces the wear on the cylinder. It also affords a quicker and more effective sealing of the piston ring in the cylinder wall during the "wear-in" period and enables the positioning of the insert to serve as a closure for the split or joint of the main ring.

In the embodiment shown in Fig. 4, the piston ring is provided with a scraper groove 11.

In the embodiment shown in the lower or bottom piston ring groove of Fig. 1 it will be noted that the ring is cut away at 12 to provide a so-called scraper edge and that the groove 6 for the element 7 is positioned close to the lower edge of the ring and opens into the cut away edge 12. It should be borne in mind that in Fig. 1 I have not intended to illustrate the three embodiments of my invention as a complete assembly for a piston as the ring shown in the bottom groove is not an oil ring and in ordinary installations an oil ring is placed in this bottom groove. I am merely showing different types of rings in the different grooves in order to simplify the drawing and in practice the ring shown in the bottom groove would not ordinarily be used in that groove. It might well be used in the second or intermediate groove in lieu of the ring shown therein.

The forming of the recesses 11 and 12 in a cast iron piston ring has a tendency to distort the ring somewhat and this is deemed desirable by certain engineers and for certain installations. The forming of the groove 6 adjacent the lower side of the ring and so that it opens into the recess 12 adds somewhat to the distortion but I have not attempted in these rings to show distortion. It will be understood that the distortion referred to is the making of the peripheral surface of the ring slightly conical. The rings with such recesses are commonly called scraper rings.

In the embodiment shown in Fig. 5 the ring has a beveled cut-away portion 14 which results in a restricted cylinder contacting face as just described but it also serves to somewhat more effectively support the insert.

I have illustrated and described my improvements in embodiments which I have found very practical. I have not attempted to illustrate or describe other embodiments or adaptations as it is believed that this disclosure will enable those skilled in the art to embody or adapt my invention as may be desired.

Having thus described the invention what I claim as new and desire to secure by Letters Patent is:

1. A piston ring assembly comprising a split main element of cast iron having an annular outwardly facing groove, and a thin split insert of soft readily wearing lubricating metal having flat top and bottom surfaces disposed in said groove in contractile gripping relation to the bottom thereof and with clearance relative to the side walls of the groove to permit relative sliding of the insert and main element, said insert initially projecting radially outwardly therefrom to slidably engage and deposit a coating of lubricating metal on a cylinder wall during early operation, said main element thereafter engaging the coated wall, the cylinder wall engaging area of said insert being not in excess of 30% of the corresponding area of the main element, the gaps of said insert and main element being in substantially spaced angular relation.

2. A piston ring assembly comprising a split main element of cast iron having an annular outwardly facing groove, and a thin split insert of soft readily wearing lubricating metal having flat top and bottom surfaces disposed in said groove in contractile gripping relation to the bottom thereof and with clearance relative to the side walls of the groove to permit relative sliding of the insert and main element, said insert initially projecting radially therefrom to slidably engage and deposit a coating of lubricating metal on a cylinder wall during early operation, said main element thereafter engaging the coated wall, the cylinder wall engaging area of said insert being not in excess of 30% of the face area of the main element.

3. A piston ring assembly comprising a split main element of relatively hard, wear resistant metal having an annular outwardly facing groove, and a thin split, flat surfaced insert of soft readily wearing lubricating metal disposed in said groove in contractile relation to the bottom thereof and projecting radially outwardly therefrom to slidably engage and deposit a coating of lubricating metal on a cylinder wall during early operation, said main element thereafter engaging the coated wall, the cylinder wall engaging area of said insert being in the neighborhood of 10% of the face area of the main element.

4. A piston ring assembly comprising a cast iron main ring having an annular outwardly facing groove therein spaced from its upper and lower sides, and a thin brass lubricating flat insert disposed in said groove in radial gripping engagement therewith, said insert wearing flush with the outer face of the main element during the early stage of the use of the ring whereby to deposit a coating of lubricating metal on the cylinder wall after which the coated wall is uniformly engaged by the insert and the relatively hard wear-resistant face of the main ring.

5. A piston ring assembly comprising a relatively hard main ring, and a thin flat insert of relatively soft lubricating metal carried by said main ring in gripping and circumferential slidable engagement therewith, said insert initially projecting radially beyond said main ring for wearing engagement with a cylinder wall and wearing flush with the outer face of the main ring during the early stage of the use of the ring whereby to deposit a coating of lubricating metal on the cylinder wall, after which initial period the coated wall is uniformly engaged by the relatively hard wear resistant face of the main ring.

6. A piston ring assembly comprising a split main ring and a thin cylinder wall coating element of a readily wearing lubricating metal carried by the main ring in a circumferential groove in the latter, said element being in contractile radially gripping relation to the bottom of said groove but having clearance relative to the side walls of the groove to permit relative circumferential sliding of the element and ring, the area of cylinder wall contact of said coating element being not in excess of 30% of the corresponding area of the ring element, said coating element quickly depositing a scuff-preventing film on the cylinder wall during the early use of the ring and quickly becoming flush with the face of the ring.

HAROLD P. PHILLIPS.